US007661229B2

(12) United States Patent
Frecska et al.

(10) Patent No.: US 7,661,229 B2
(45) Date of Patent: Feb. 16, 2010

(54) ELECTRICAL CONDUCTIVITY IN A SUSPENDED CEILING SYSTEM

(75) Inventors: Sandor A. Frecska, Lancaster, PA (US); Brian T. Patterson, Lewisberry, PA (US); William E. Beakes, Columbia, PA (US); Jere W. Myers, Washington Boro, PA (US); Joseph R. Woelfling, Palmyra, PA (US)

(73) Assignee: Worthington Armstrong Venture, Malvern, PA (US)

( * ) Notice: Subject to any disclaimer, the term of this patent is extended or adjusted under 35 U.S.C. 154(b) by 461 days.

(21) Appl. No.: 11/127,853

(22) Filed: May 12, 2005

(65) Prior Publication Data

US 2006/0272256 A1 Dec. 7, 2006

(51) Int. Cl.
*H02G 3/38* (2006.01)

(52) U.S. Cl. ....................... 52/220.6; 52/29; 52/506.06; 174/491

(58) Field of Classification Search ..................... 52/28, 52/29, 220.6, 220.7, 506.06, 506.07; 174/49, 174/491
See application file for complete search history.

(56) References Cited

U.S. PATENT DOCUMENTS

| | | | | |
|---|---|---|---|---|
| 2,905,806 A | | 9/1959 | Tunney | 240/3 |
| 3,001,001 A | * | 9/1961 | Bibb | 174/71 R |
| 3,504,172 A | | 3/1970 | Liberman | 240/78 |
| 3,590,135 A | * | 6/1971 | Herbenar et al. | 174/491 |
| 3,683,100 A | | 8/1972 | Deal et al. | 174/48 |
| 3,725,568 A | | 4/1973 | Stanley | 174/48 |
| 3,781,567 A | | 12/1973 | Papsco | 307/147 |
| 4,109,305 A | | 8/1978 | Claussen et al. | 362/418 |
| 4,414,617 A | | 11/1983 | Galindo | 362/404 |
| 4,540,847 A | * | 9/1985 | Gardner | 174/491 |
| 4,631,648 A | | 12/1986 | Nilssen | 362/150 |
| 4,822,292 A | | 4/1989 | Thayer et al. | 439/207 |
| 5,154,509 A | | 10/1992 | Wulfman et al. | 362/226 |
| 5,455,754 A | | 10/1995 | Hoffner | 362/250 |
| 5,941,627 A | | 8/1999 | Sacher | 362/249 |
| 6,190,198 B1 | | 2/2001 | Ray | 439/532 |
| 6,722,918 B2 | | 4/2004 | McCoy | 439/533 |
| 6,827,592 B2 | | 12/2004 | McCoy et al. | 439/118 |
| 7,338,182 B1 | * | 3/2008 | Hastings et al. | 362/150 |
| 7,351,075 B1 | * | 4/2008 | Patterson et al. | 439/121 |
| 2002/0109984 A1 | | 8/2002 | Bischel et al. | 362/150 |
| 2003/0207612 A1 | | 11/2003 | McCoy | 439/533 |

FOREIGN PATENT DOCUMENTS

WO WO 9638828 A1 * 12/1996

* cited by examiner

*Primary Examiner*—Richard E Chilcot, Jr.
*Assistant Examiner*—Alp Akbasli

(57) ABSTRACT

A ceiling system including a grid framework having a plurality of grid elements arranged in a substantially horizontal plane. A conductive material is embedded in one of the plurality of grid elements. The grid element in which the conductive material is embedded includes at least one slot such that portions of the conductive material are exposed. A tap is attached to the grid element so that it is in alignment with the slot, and, in turn, with the conductive material. The tap includes a housing, a conductor engaging means and a tap conductor. The conductor engaging means forms a connection with the conductive material embedded in the grid element and the tap conductor.

16 Claims, 6 Drawing Sheets

ELECTRICAL CONDUCTIVITY IN A SUSPENDED CEILING SYSTEM

BACKGROUND

The invention relates to a suspended ceiling system, and, in particular, to a ceiling having conductive material embedded in the grid framework. By using electrical taps in combination with the conductive material, the ceiling system is able to distribute low voltage electricity above, below and within the plane of the grid framework.

A conventional ceiling grid framework includes main grid elements running the length of the ceiling with cross grid elements therebetween. The main and cross elements form the ceiling into a grid of polygonal shaped openings into which functional devices such as ceiling tiles, light fixtures, speakers and the like can be inserted and supported. The grid framework and ceiling tile system may provide a visual barrier between the living or working space and the infrastructure systems mounted overhead.

There is an increasing desire to have electrical functionality, such as power and signal transmission, in the ceiling environment. For several reasons, including aesthetic appeal, conventional techniques include mounting cable trays and electrical junction boxes in the plenum space above the ceiling grid framework. Such systems result in a complex network of wires which occupy the limited space above the ceiling grid, and, once installed, are difficult to service and reconfigure. Moreover, these techniques are limited in that the electricity they provide to the ceiling environment is not accessible from all directions relative the ceiling plane. In other words, electricity can be easily accessed from the plenum but not from areas within or below the plane of the grid framework. Thus, there is a need to provide electrical functionality to the ceiling which can be accessed from above, below and within the plane of the grid framework.

SUMMARY

The ceiling system of the invention includes a grid framework having a plurality of grid elements arranged in a substantially horizontal plane. A conductive material is embedded in at least one of the plurality of grid elements. The grid element in which the conductive material is embedded includes at least one slot such that portions of the conductive material are exposed. At least one tap is attached to the grid element so that it is in alignment with the slot, and, in turn, with the conductive material. Each tap includes a housing, a conductor engaging means and a tap conductor. The conductor engaging means forms a connection with the conductive material embedded in the grid element and the tap conductor.

The ceiling system provides several advantages which include, but are not limited to: a simplified manner in which electricity is accessed from all directions relative the plane of the grid framework; the preservation of the aesthetics of the ceiling due to the ability to distribute electricity using a standard grid profile; and the ability to replace or relocate devices without having to modify the grid.

DETAILED DESCRIPTION

Figure 1:
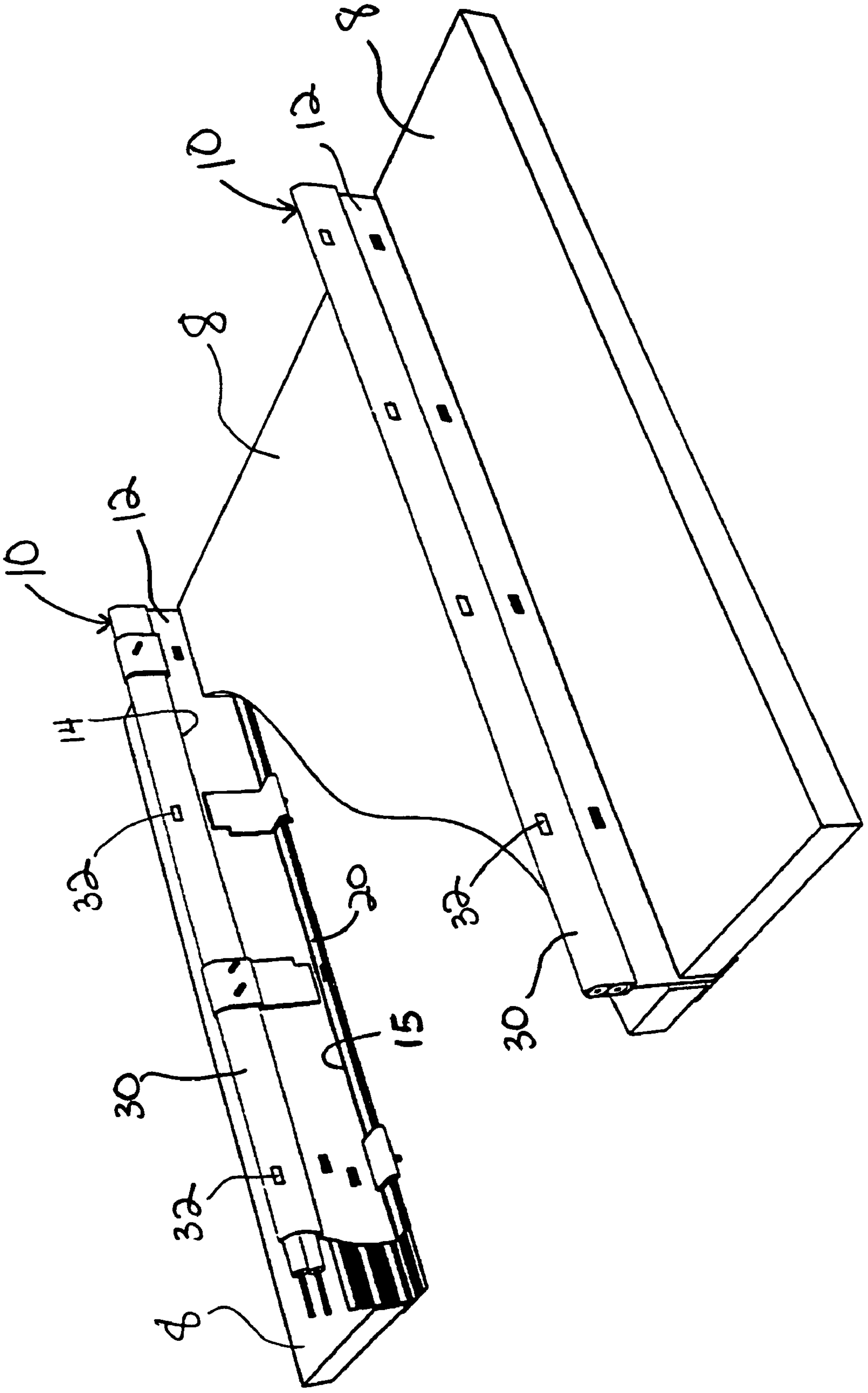
FIG. 1 is a fragmentary perspective view from above of the ceiling system in accordance with an exemplary embodiment of the invention, and showing various optional features of the invention.

Reference is now made to the drawings wherein similar components bear the same reference numerals throughout the several views. FIG. 1 illustrates a portion of the ceiling system, showing various optional features of the invention. A conventional suspended ceiling system includes a plurality of grid elements which form a conventional grid framework. Each grid element can be formed from a single piece of sheet metal, such as steel or aluminum, by conventional means such as folding and stamping.

In the example embodiment illustrated in FIGS. 1-4, each grid element 10 includes a vertical web portion 12 which is integral with a hollow bulb portion 30 at top edge 14 and with a flange portion 20 at bottom edge 15. The flange portion 20 is formed on and centered along the bottom edge 15. The flange portion 20 has a top surface 21 and a bottom surface 23.

Figure 2:
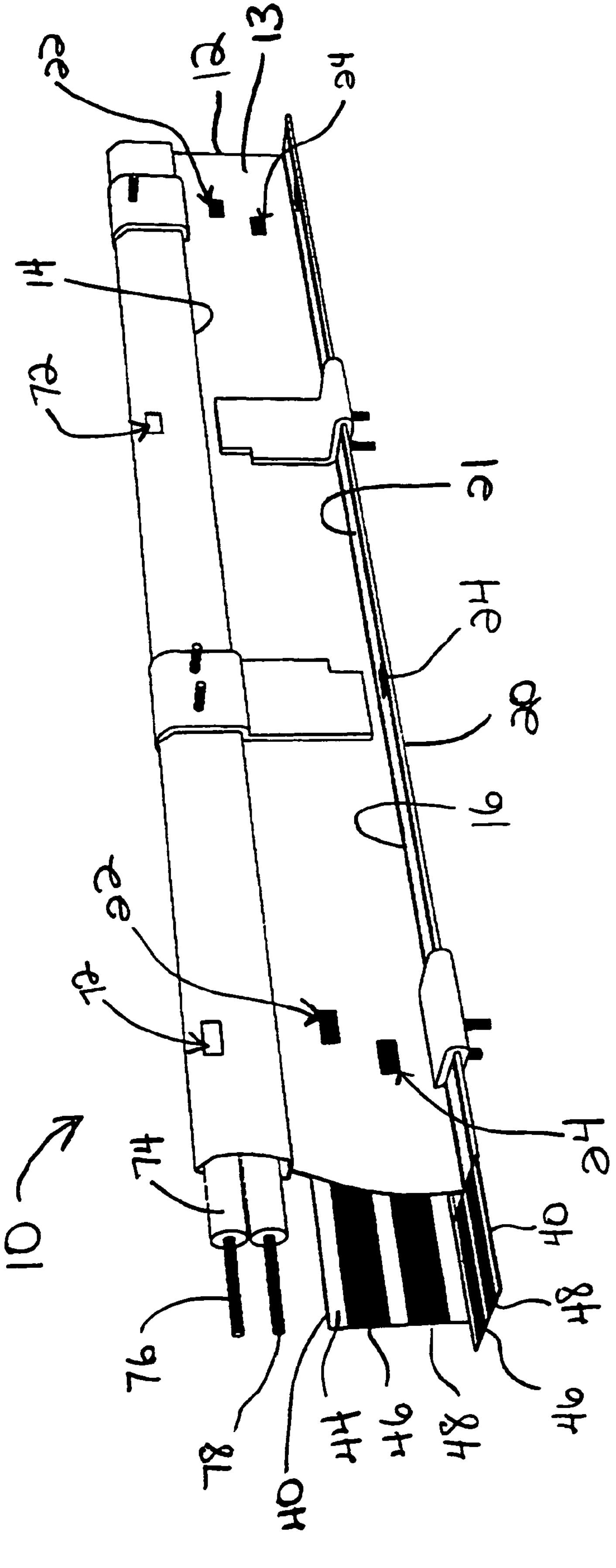
FIG. 2 is a perspective view of a grid element forming part of the ceiling system shown in FIG. 1, and showing various optional features of the invention.
Figure 3:
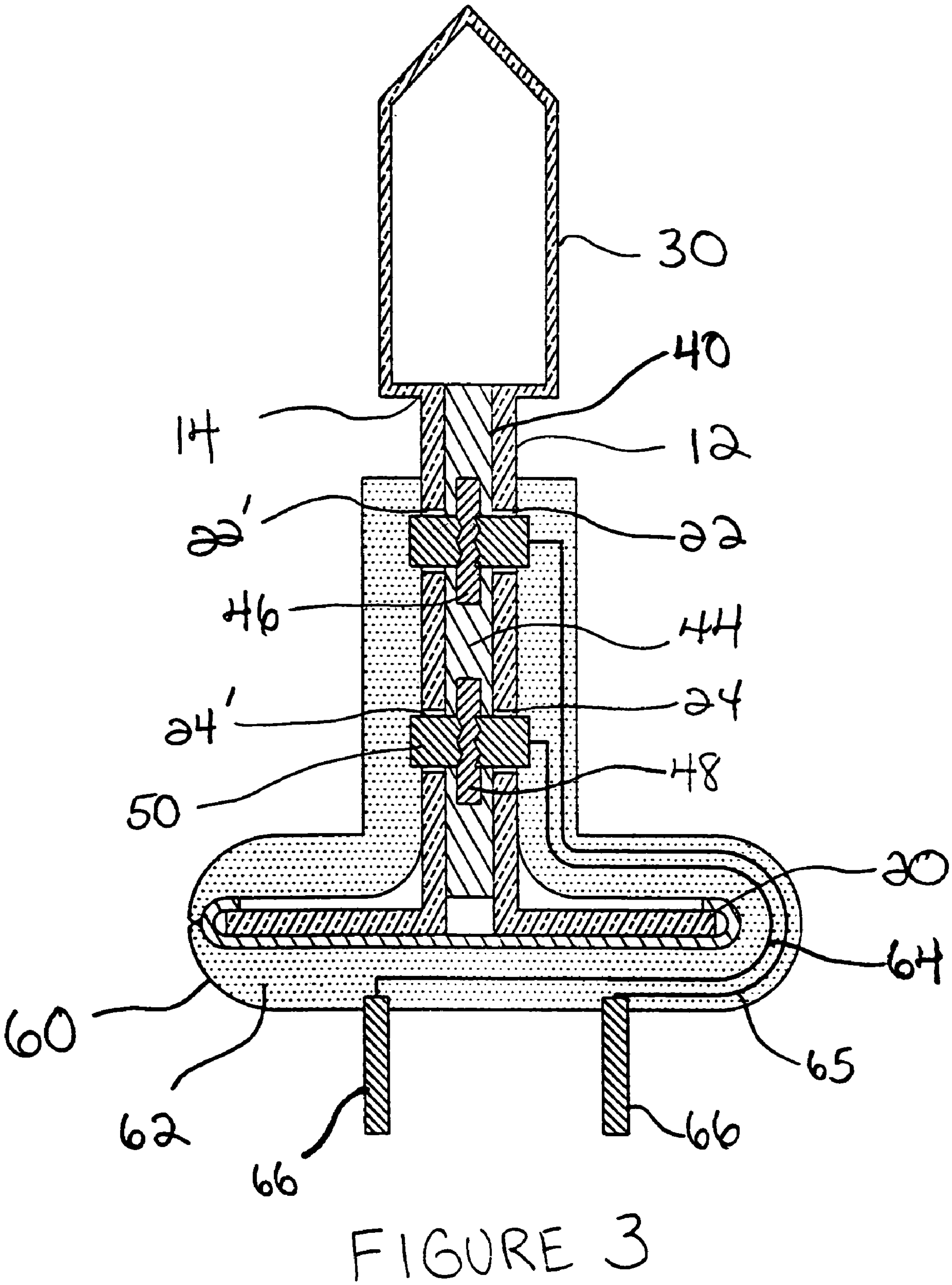
FIG. 3 is a cross sectional view of a grid element in accordance with an exemplary embodiment of the invention.

In the example embodiment shown in FIGS. 2 and 3, formed in each side of the vertical web portion 12 are upper and lower conductor access slots 22, 22', 24, 24'. Upper conductor access slot 22, which is formed in a first side 13 of the vertical web portion 12, may be longitudinally aligned with, or longitudinally offset from, lower conductor access slot 24. FIG. 2 illustrates slots 22 and 24 as longitudinally offset. Similarly, upper conductor access slot 22' may be aligned with, or longitudinally offset from, lower conductor access slot 24'. In either case, as shown in FIG. 3, the upper conductor access slots, 22 and 22', are transversely aligned with one another on opposing sides of the vertical web portion 12. Likewise, the lower conductor access slots, 24 and 24', are transversely aligned with one another.

A conventional conductive strip 40 is embedded within the vertical web portion 12. The conductive strip 40 includes an insulator 44 which encapsulates first and second conductors, 46 and 48 respectively, which can be formed from materials such as, but not limited to, copper, conductive plastic and conductive fiber. For polarity, one conductor is positive and the other is negative. The conductors 46, 48 are vertically spaced and extend in parallel relation to one another, such that the upper slots 22 and 22' are transversely aligned with conductor 46 and lower slots 24 and 24' are transversely aligned with conductor 48.

Turning to FIG. 3, a tap 60 is attached to the web 12 and flange portion 20 of the grid element 10. The tap includes a housing 62 which covers the vertical web portion 12 and flange portion 20 of the grid element 10. Housing 62 is preferably shaped to closely conform to the grid element 10 to provide ease in crimping, as described below. The conforming shape of the housing 62 provides clearance for a ceiling panel 8, which is manufactured for use in the ceiling system, to be installed without having to modify the size of the panel.

The tap 60 further includes a conductor engaging means 50. In the configuration illustrated in FIG. 3, the conductor engaging means is a plurality crimp connectors. Each crimp connector 50 is at least partially embedded in the housing 62 and is positioned in the housing 62 such that when the housing is attached to the grid element, each crimp connector is in transverse alignment with a conductor access slot 22, 22', 24, 24' and, in turn, in transverse alignment with a respective flat wire conductor 46, 48. Each conductor access slot 22, 22', 24, 24' allows for insertion of a crimp connector 50 into the vertical web portion 12. Thus, when the tap housing 62 is crimped using a conventional crimping tool, the crimp connector 50 is able to pierce the insulation 44 of the conductive strip 40 and make electrical contact with either conductor 46 or 48. Insulator 44 is formed from materials soft enough to be pieced easily by a crimp connector 50. Example materials for insulator 44 include plastic, rubber and organic foam.

The tap 60 also includes tap conductors 64 and 65 which are preferably embedded in the tap housing 62. Similar to conductors 46 and 48 of conductive strip 40, for polarity, one tap conductor is positive and the other is negative. Each tap conductor 64, 65 is attached to a crimp connector 50 at one end and to a connecting stud 66 at the opposite end. Each connecting stud 66, is partially embedded in the housing 62, extends outwardly from the outer surface of the housing 62 and serves as a connector for electrically powered devices. Exemplary electrically powered devices include light fixtures, low voltage light fixtures, speakers, cameras, motors, motion sensors and smoke detectors.

Figure 5:
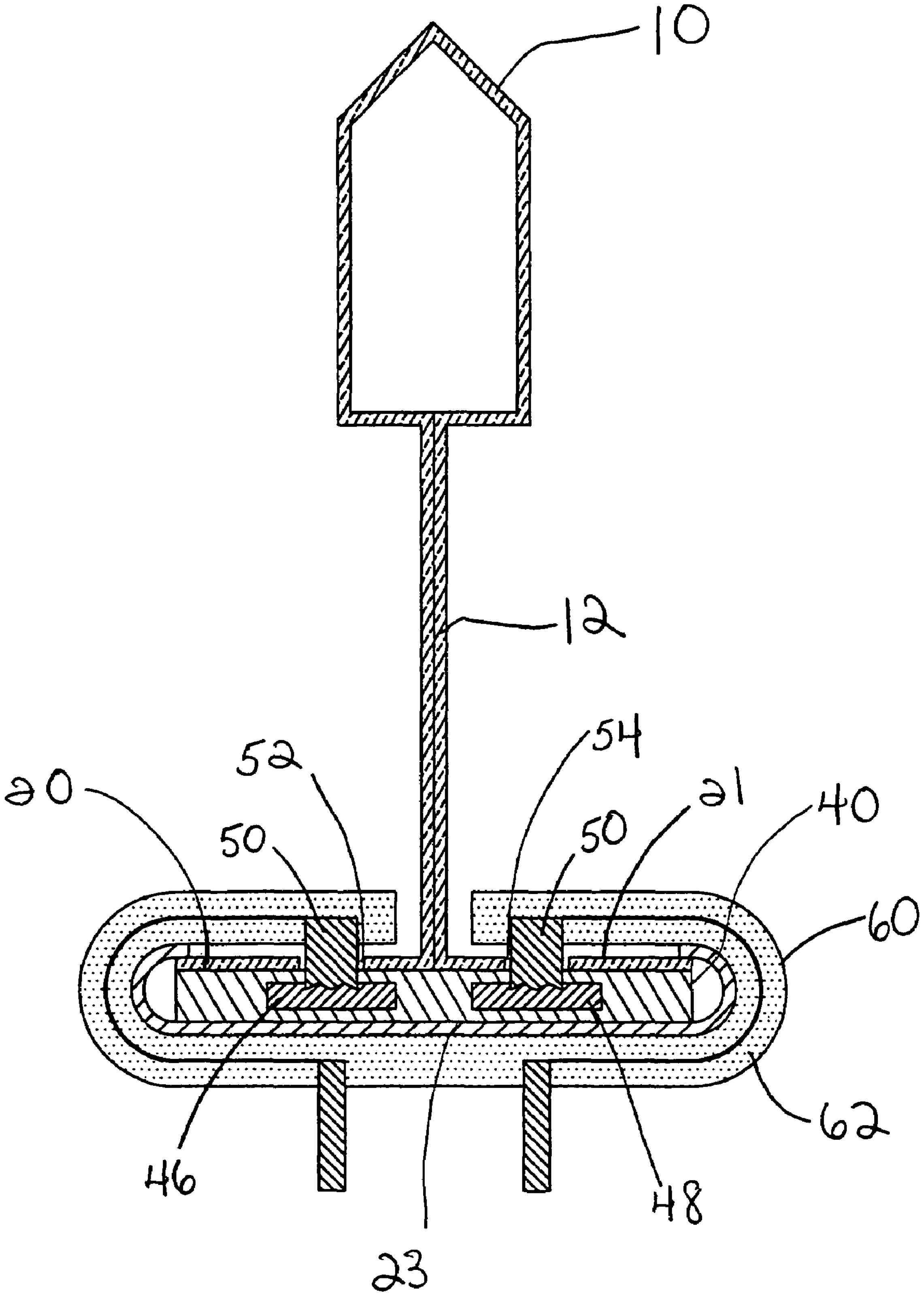
FIG. 5 is a cross sectional view of a grid element in accordance with a third exemplary embodiment of the invention.
Figure 6A:
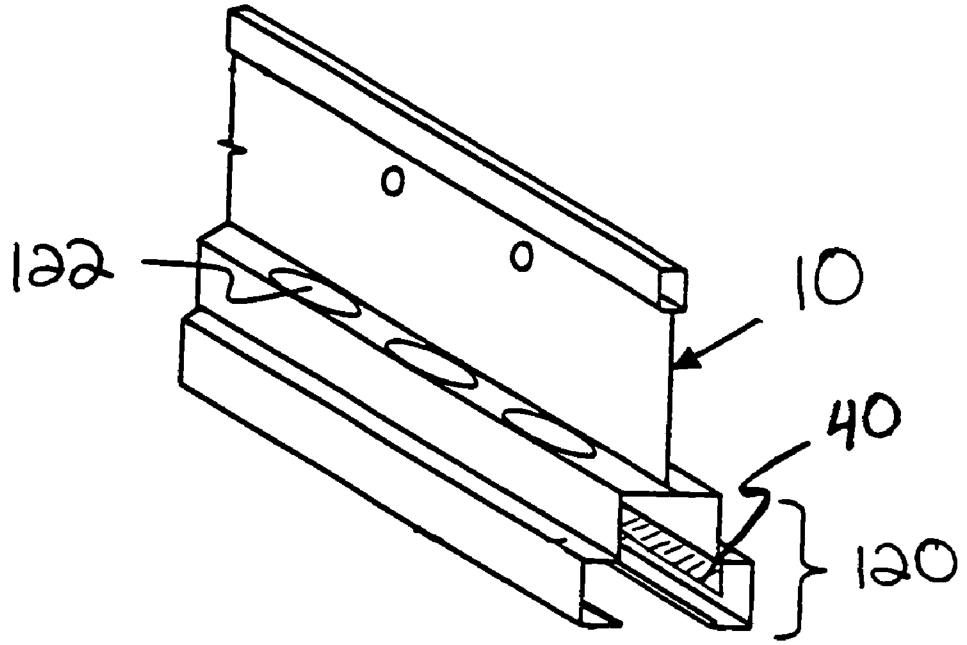
FIG. 6*a* is a cross sectional view of a grid element having a track.
Figure 6B:
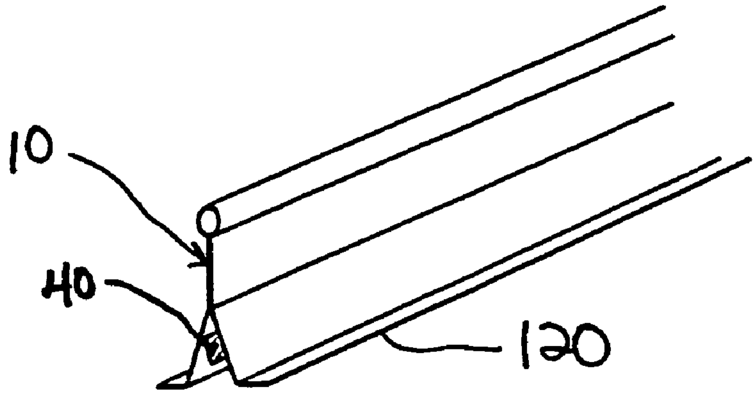
FIG. 6*b* is a cross sectional view of an alternative grid element having a track.

FIGS. 2 and 5 illustrate an alternative example configuration in which the conductive strip 40 is embedded in the lower flange portion 20 of the grid element 10. In this configuration, the conductor access slots 52 and 54 are formed in the lower flange portion 20 of the grid element 10. More specifically, access slots 52 and 54 are formed in the upper surface 21 of the lower flange portion 20 on opposing sides of the vertical web portion 12. Conductor access slots 52 and 54 may either be longitudinally aligned or longitudinally offset from one another. Optionally, conductor access slots (not shown) can be formed in the bottom surface 23 of the lower flange portion 20, such that a conductor access slot is in transverse alignment with conductor access slot 52 and conductor access slot is in transverse alignment with conductor access slot 54.

In this configuration, conductors 46 and 48 are spaced horizontally and extend in parallel relation to one another in the longitudinal direction of the grid element, such that access slot 52 is in transverse alignment with conductor 46 and access slots 54 is in transverse alignment with conductor 48. In addition, the tap 60 is attached to the flange portion 20 of the grid element 10. It should be noted that a tap 60 which covers the flange portion 20, as well as, the vertical web portion 12 can also be used. In either case, each crimp connector 50 is positioned in housing 62 such that the crimp connector 50 is in transverse alignment with a respective conductor access slot 52, 54, and, thus, in turn with a respective conductor 46, 48.

Figure 4:
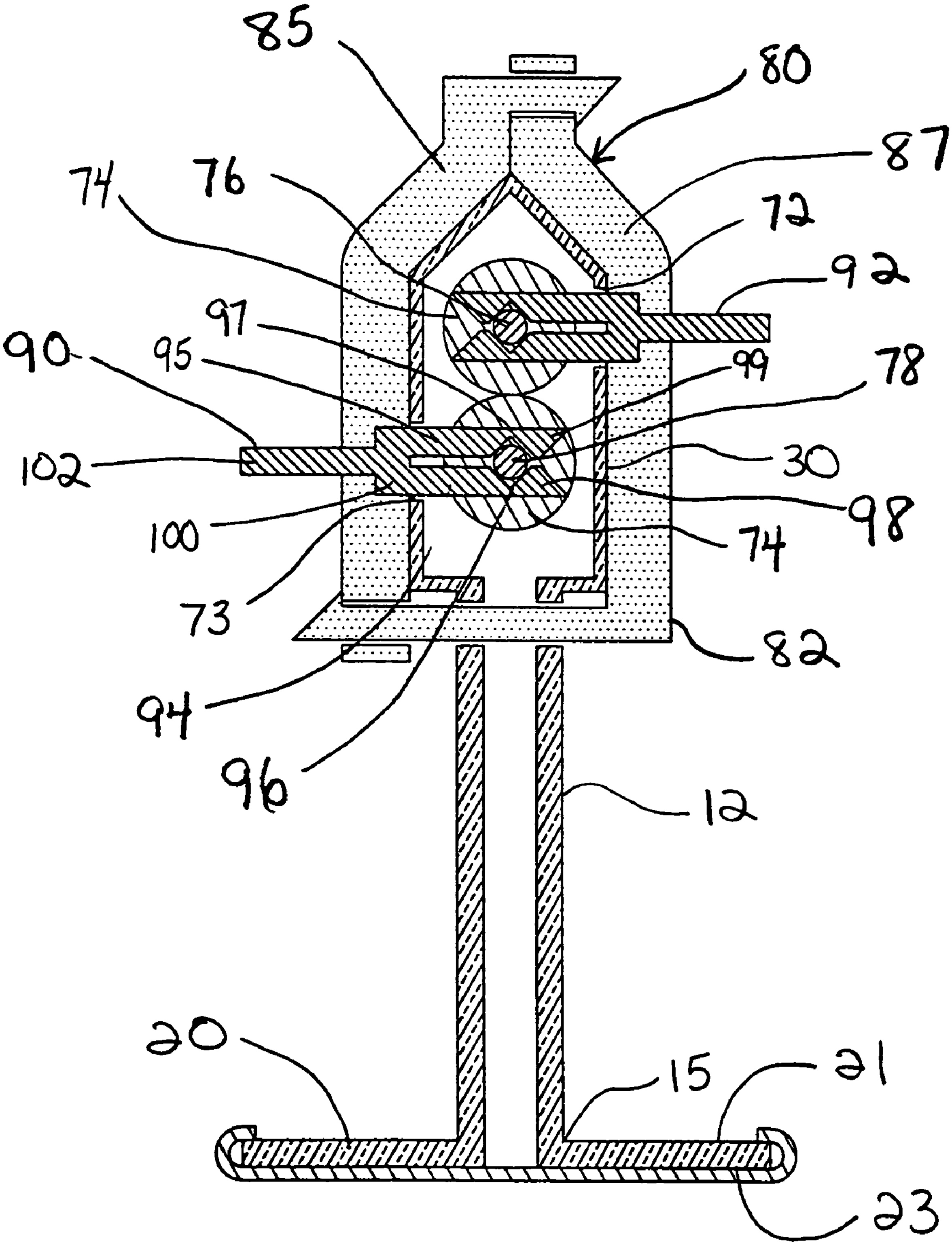
FIG. 4 is a cross sectional view of a grid element in accordance with a second exemplary embodiment of the invention.

A third example embodiment is shown in FIGS. 2 and 4. Embedded within the bulb portion 30 are first and second vertically spaced conductors, 76 and 78 respectively. Each of the vertically spaced conductors, 76, 78 is contained in an insulator 74. Formed in hollow bulb portion 30 of grid element 10 are first and second conductor access slots, 72 and 73 respectively. The first and second conductor access slots 72, 73 are formed in opposite sides of the bulb portion 30 and are transversely offset from one another. Thus, the first conductor access slot 72 is aligned with conductor 76 and the second access slot 73 is aligned with conductor 78.

Turning to FIG. 4, a tap 80 is attached to the bulb portion 30 of the grid element 10 and is shaped to closely conform to at least the bulb portion 30 of the grid element 10. The tap 80 includes a housing 82 which may be constructed of multiple components or a single piece. In the example embodiment shown in FIG. 4, the tap housing 82 includes a first half body 85 and a second half body 87. The housing 82 is formed from an insulating material such as plastic or rubber. Each half body 85, 87 is formed to cover at least one side of the bulb portion 30.

Partially embedded in each of the first and second half bodies 85, 87 are U-shaped contacts 90 and 92 respectively. Each contact 90, 92 has the same components and will described herein with reference to contact 90. Contact 90 has a lower arm 94 having a notch 96 adapted to engage the lower surface of conductor 78 and a pointed end 98 for piercing insulator 74. Contact 90 also has an upper arm 95 having a notch 97 adapted to engage the upper surface of conductor 78 and a pointed end 99 for piercing insulator 74. The lower arm 94 and upper arm 95 of the contact 90 are joined by base 100. Base 100 is embedded in half body 85 and the lower and upper arms 94 and 95 extend through conductor access slot 73 in bulb portion 30. Connected to base 100 of contact 90 is connecting stud 102 which extends outwardly from the outer surface of the half body 85 and serves as a connecting device for electrical appliances and the like.

The description of the example embodiments of the present invention is given above for the understanding of the present invention. It will be understood that the invention is not limited to the particular embodiments described herein, but is capable of various modifications, rearrangements and substitutions which will now become apparent to those skilled in the art without departing from the scope of the invention.

For example, for illustrative purposes, T-bar grid elements are shown throughout the drawings, however, it should be noted that grid elements of various configurations may also be used, such as those sold by Armstrong World Industries, Inc. More particularly, the lower flange portion 20 of the grid element 10 may form a track 120, or bracket, as shown in FIGS. 5A and 5B. Similarly, a cap in the form of a track may be mounted on the lower flange portion 20 of a grid element 10. The entire track 120 length is available for insertion of functional devices from below the ceiling plane. The flat wire conductive strips 40 are housed in the track as shown in FIGS. 5A and 5B. In order to access the flat wire conductive strips 40 from above the plane of the grid framework, apertures 122 can be formed in track 120.

It is intended that the following claims cover all such modifications and changes as fall within the true spirit and scope of the invention.

What is claimed is:

1. A suspended ceiling system comprising:

a plurality of grid elements forming a grid network arranged in a substantially horizontal plane, wherein a grid element extends longitudinally and includes first and second electrical access slots, the first and second access slots being longitudinally and vertically offset from one another;

first and second conductive strips having opposing polarity, the first and second conductive strips being partially embedded in a the grid element such that at least a portion of each of the first and second conductive strips is exposed; and a tap attached to the grid element, wherein the combination of the conductive strips and the tap provide electricity to the ceiling environment which is accessible from above, below and within the plane of the grid network.

2. The suspended ceiling system of claim 1, wherein the grid element has a vertical web portion, wherein the first and second access slots are formed in opposing sides of the vertical web portion.

3. The suspended ceiling system of claim 1, wherein the grid element has a vertical web portion, the first and second access slots being located on the same side of the vertical web portion.

4. The suspended ceiling system of claim 1, wherein the tap includes a housing, a conductor engaging means and a tap conductor, wherein the conductor engaging means forms a connection between the tap conductor and the first and second conductive strips.

5. The suspended ceiling system of claim 4, wherein the conductor engaging means is partially embedded in the housing.

6. The suspended ceiling system of claim 4, wherein the conductor engaging means is a crimp connector.

7. The suspended ceiling system of claim 4, wherein the conductor engaging means is in transverse alignment with at least one of the first and second access slots formed in the grid element.

8. The suspended ceiling system of claim 4, wherein the housing is formed from multiple components.

9. The suspended ceiling system of claim 4, wherein the housing conforms to a flange portion of the grid element.

10. The suspended ceiling system of claim 4, wherein the housing conforms to a vertical web portion of the grid element.

11. The suspended ceiling system of claim 4, wherein the housing conforms to a bulb portion of the grid element.

12. The suspended ceiling system of claim 4, wherein the tap conductor is embedded in the housing.

13. The suspended ceiling system of claim 12, wherein the tap conductor is attached to a stud.

14. The suspended ceiling system of claim 1, wherein each of the first and second conductive strips includes a flat wire conductive strip.

15. The suspended ceiling system of claim 14, wherein each of the first and second conductive strips includes an insulator which encapsulates the flat wire conductive strip.

16. The suspended ceiling system of claim 1, wherein a flange portion of the grid element forms a track in which the first and second conductive strips are housed, the track containing an aperture for accessing the exposed portion of the first and second conductive strips formed therein.

* * * * *